US009170367B2

(12) United States Patent
Messerly et al.

(10) Patent No.: US 9,170,367 B2
(45) Date of Patent: Oct. 27, 2015

(54) WAVEGUIDES HAVING PATTERNED, FLATTENED MODES

(71) Applicant: Lawrence Livermore National Security, LLC, Livermore, CA (US)

(72) Inventors: Michael J. Messerly, Danville, CA (US); Paul H. Pax, Livermore, CA (US); Jay W. Dawson, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 218 days.

(21) Appl. No.: 13/804,252

(22) Filed: Mar. 14, 2013

(65) Prior Publication Data

US 2013/0202264 A1 Aug. 8, 2013

Related U.S. Application Data

(63) Continuation-in-part of application No. 13/162,351, filed on Jun. 16, 2011, now Pat. No. 8,798,422.

(51) Int. Cl.
| | |
|---|---|
| G02B 6/02 | (2006.01) |
| H01S 3/067 | (2006.01) |
| C03B 37/012 | (2006.01) |
| C03B 37/014 | (2006.01) |
| C03B 37/018 | (2006.01) |
| F21V 8/00 | (2006.01) |

(52) U.S. Cl.
CPC ........ *G02B 6/02338* (2013.01); *H01S 3/06741* (2013.01); *C03B 37/01211* (2013.01); *C03B 37/01413* (2013.01); *C03B 37/01807* (2013.01); *C03B 2203/22* (2013.01); *G02B 6/0008* (2013.01); *G02B 6/02* (2013.01); *G02B 6/02042* (2013.01)

(58) Field of Classification Search
CPC ........................ G02B 6/02328; H01S 3/06741
See application file for complete search history.

(56) References Cited

U.S. PATENT DOCUMENTS

| | | | |
|---|---|---|---|
| 2005/0157998 A1 * | 7/2005 | Dong et al. | 385/126 |
| 2010/0008634 A1 * | 1/2010 | Guertin et al. | 385/126 |
| 2013/0039627 A1 * | 2/2013 | Li et al. | 385/126 |

OTHER PUBLICATIONS

Dawson et al., "Analysis of the Scalability of Diffraction-Limited Fiber Lasers and Amplifiers to High Average Power," Optics Express, vol. 16, No. 17, pp. 13240-13266, (2008).

Dawson et al., "Large Flattened Mode Optical Fiber for Reduction of Non-Linear Effects in Optical Fiber Lasers," Proc. of SPIE, vol. 5335, pp. 132-139, (2004).

(Continued)

*Primary Examiner* — Jerry Rahll
(74) *Attorney, Agent, or Firm* — John P. Wooldridge

(57) ABSTRACT

Field-flattening strands may be added to and arbitrarily positioned within a field-flattening shell to create a waveguide that supports a patterned, flattened mode. Patterning does not alter the effective index or flattened nature of the mode, but does alter the characteristics of other modes. Compared to a telecom fiber, a hexagonal pattern of strands allows for a three-fold increase in the flattened mode's area without reducing the separation between its effective index and that of its bend-coupled mode. Hexagonal strand and shell elements prove to be a reasonable approximation, and, thus, to be of practical benefit vis-à-vis fabrication, to those of circular cross section. Patterned flattened modes offer a new and valuable path to power scaling.

17 Claims, 14 Drawing Sheets

(56) References Cited

OTHER PUBLICATIONS

Fini et al., "Natural Bend-Distortion Immunity of Higher-Order-Mode Large-Mode-Area Fibers," Optics Letters, vol. 32, No. 7, pp. 748-750, (2007).

Ghatak et al., "Design of Waveguide Refractive Index Profile to Obtain Flat Modal Field," Proc. of SPIE, vol. 3666, pp. 40-44, (1999).

Kang et al., "Flat-Topped Beam Output from a Double-Clad Rectangular Dielectric Waveguide Laser with a High-Index Inner Cladding," Optics Communications, vol. 282, pp. 2407-2412, (2009).

Michaille et al., "Multicore Photonic Crystal Fiber Lasers for High Power/Energy Applications," IEEE Journal of Selected Topics in Quantim Electronics, vol. 15, No. 2, pp. 328-336, (2009).

Quimby et al., "Yb3+ Ring Doping in High-Order-Mode Fiber for High-Power 977-nm Lasers and Amplifiers," IEEE Journal of Selected Topics in Quantum Electronics, vol. 15, No. 1, pp. 12-19, (2009).

Ramachandran et al., "Light Propagation with Ultralarge Modal Areas in Optical Fibers," Optics Letters, vol. 31, No. 12, pp. 1797-1799, (2006).

Ramachandran et al., "Ultra-Large Effective-Area, Higher-Order Mode fibers: A new Strategy for High-Power Lasers," J. of InterScience, pp. 429-448, (2008).

Russell, "Photonic-Crystal Fibers," J. of Lightwave Tech., vol. 24, No. 12, pp. 4729-4749, (2006).

Stolen et al., "Self-Phase-Modulation in Silica Optical Fibers," Physical Review A, vol. 17, No. 4, pp. 1448-1454, (1978).

Torruellas et al., "High Peak Power Ytterbium Doped Fiber Amplifiers," Proc. of SPIE, vol. 6102, pp. 1-7, (2006).

Wang, et al., "Single-Mode Operations in the Large Flattened Mode Optical fiber Lasers and Amplifiers," J. Opt. A: Pure Appl. Opt, 11, 1-5, (2009).

Ward et al., "Photonic Crystal Fiber Designs for Power Scaling of Single-Polarization Amplifiers," Proc. of SPIE, vol. 6453, pp. 1-9, (2007).

Wong et al., "Excitation of Orbital Angular Momentum Resonances in Helically Twisted Photonic Crystal Fiber," Science, vol. 337, pp. 446-449, (2012).

Yeh, et al., "Electromagnetic Propagation in Periodic Stratified Media. I. General Theory," J. Opt. Soc. Am., vol. 67, pp. 423-438, (1977).

Zhao et al., "Design Guidelines and Characteristics of a Four-Layer Large Flattened Mode Fiber," Chinese Optics Letters, vol. 5, Supple., pp. S86-S88, (2007).

\* cited by examiner

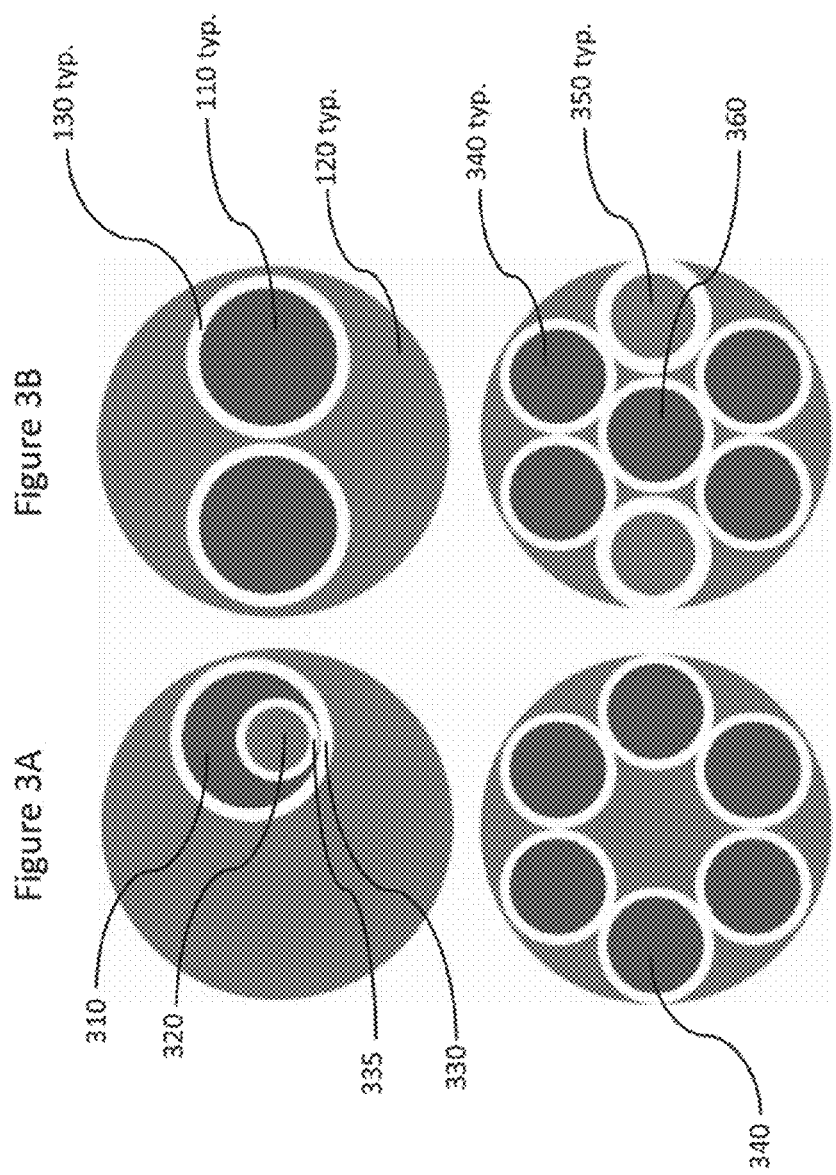

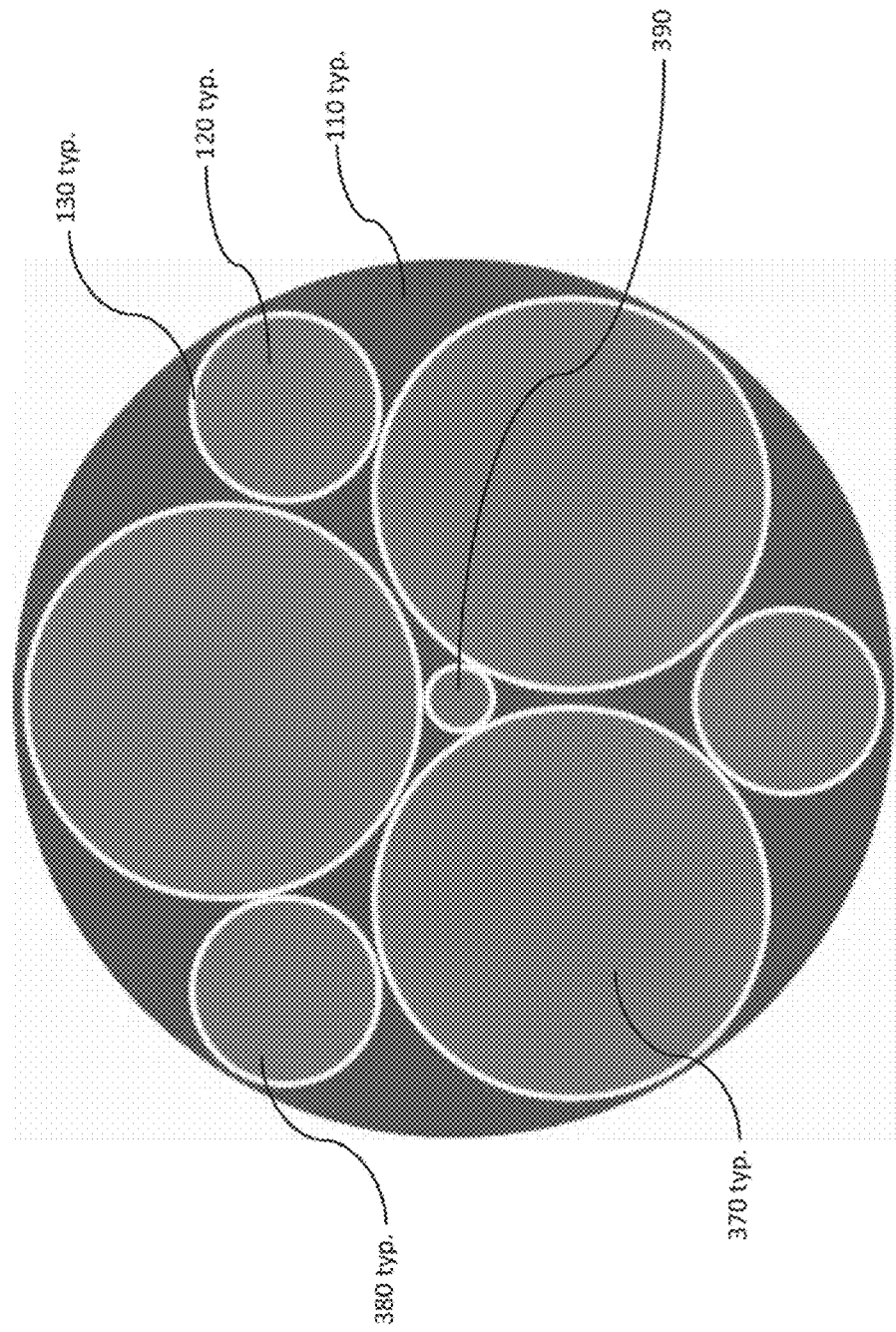

coating region
inner region
outer region

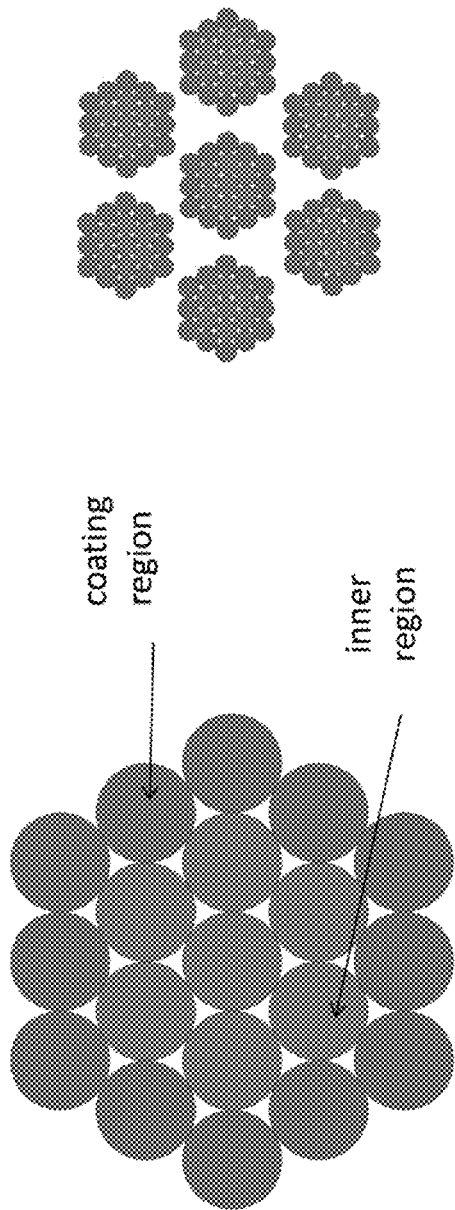
Figure 13A
Figure 13B
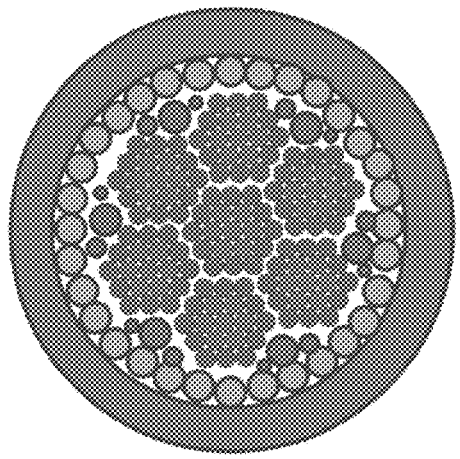
Figure 13C
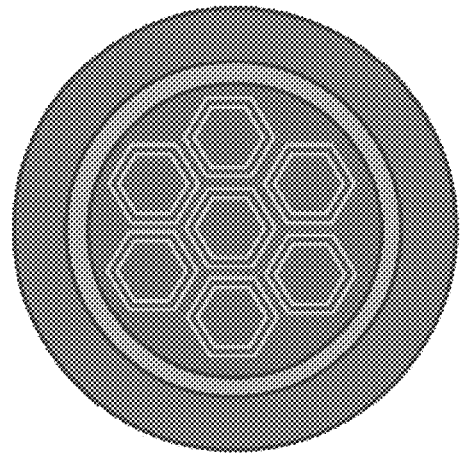
Figure 13D

WAVEGUIDES HAVING PATTERNED, FLATTENED MODES

CROSS-REFERENCE TO RELATED APPLICATIONS

This application is a continuation-in-part of U.S. patent application Ser. No. 13/162,351, filed Jun. 16, 2011, titled "OPTICAL WAVEGUIDES HAVING FLATTENED HIGH ORDER MODES," incorporated herein by reference.

STATEMENT REGARDING FEDERALLY SPONSORED RESEARCH OR DEVELOPMENT

The United States Government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND OF THE INVENTION

1. Field of the Invention

The present invention relates to waveguides that propagate light at multiple, yet discrete speeds—equivalently, multiple discrete transverse modes—and that transport telecommunications signals, generate or amplify light, transport electromagnetic power, or are used for decorative or display purposes.

2. Description of Related Art

For optical fiber lasers to scale to higher energies and powers, the fibers themselves must have greater cross-sectional areas in order to withstand those energies and powers. However, merely scaling the dimensions of optical fibers leads to systematic problems that can compromise the performance and utility of the very systems that they are intended to service. As an example, fibers of large cross sections can support a large number of spatial modes that scale with the square of the fiber diameter relative to the wavelength. Fibers with many higher-order modes result in "hot spots" in the guided optical beam, which can result in catastrophic optical damage and undesirable nonlinear optical effects. In addition, fibers that support a large number of modes can limit the bandwidth (e.g., the data rate) of communication information. This follows since each mode propagates at a slightly different speed through the fiber, with the result that a short optical pulse will temporally spread over a given length of fiber.

Several approaches to increase the effective cross-sectional area of a fiber have been discussed in the literature. In one case, the fiber is designed to maintain but a single spatial mode as the physical size of the fiber increases, thereby increasing the effective cross-sectional area of the fiber. Although functional in many applications, these large-area single-mode fibers are susceptible to bending losses. In another approach, a fiber can be designed to support many higher-order modes (HOM). These HOM fibers, can, in fact, result in a larger effective cross-sectional area, but, circularly symmetric versions suffer from hot spots that reduce the thresholds for nonlinear artifacts and damage.

The present invention circumvents these limitations. Using so-called field-flattening designs, a well tailored, single-spatial-mode HOM fiber can be realized, without the deleterious effects of hot spots. Moreover, by enabling asymmetric structures with azimuthal modal patterns, the resultant fibers can be designed to realize large effective cross-sectional areas, with a spatially uniform mode, as well as to realize polarization-maintaining fibers. Moreover, by fabricating the fiber with a helical (twisted) preform, the resultant HOM, field-flattened fiber can provide an output field with a specific optical angular momentum state, which has myriad potential applications. In general, the fiber structures described herein can be fabricated to possess optical gain regions, with potential application to long-haul communication links, and high-power beam delivery systems for commercial and defense needs. An added feature is that these amplifying fibers can be designed using uniform gain regions, so that the need for non-uniform doping regions can be obviated.

As noted above, a major problem currently exists when scaling fibers (and waveguides) to support higher-order spatial modes, namely, that these structures can result in hot spots, which can lead to optical damage as well as undesirable nonlinear optical artifacts. In addition, existing scaling design rules can result in fibers with multiple spatial optical modes, each of which possess differing propagation speeds (i.e., modal dispersion). In conventional fibers, this state of affairs can lead to undesirable mode mixing, which can also limit the data rate and/or bandwidth in long-haul optical communication links.

Specifically, in the latter case, as one scales up the mode area in conventional fibers, the modal separation decreases in inverse proportion. This decrease in mode separation is undesirable in that it exacerbates modal mixing, which, as noted above, adversely affects the performance of fibers for beam delivery and communication purposes, among others. Moreover, as the fiber scales in size, the presence of additional modes makes it more and more difficult to launch a beam into a single, desired guided mode without exciting undesirable neighboring modes.

Conventional waveguides have other shortcomings as well. While it is known that the high order modes of circularly symmetric waveguides have larger modal separations than the low order modes of these guides, the high order modes suffer from on-axis "hot spots" which may limit the power or energy those modes can carry, and this detriment may outweigh their modal separation benefit. Specifically, these spatial intensity peaks can result in deleterious nonlinear propagation artifacts, which can induce power or energy to couple from a single desired HOM into other modes, degrading the quality of the beam emitted by the waveguide. That is, the diffraction-limited spot size increases, with the result that the minimal focal size of the beam increases. In addition, as the number of spatial modes increases, undesirable optical hot spots appear in the output beam. Conventional waveguides tend to have a packing efficiency of roughly 50%. It is desirable that waveguides have packing efficiency that approaches 100%. This latter benefit is enjoyed by the now well-known waveguides whose fundamental modes are power-flattened. However, those latter waveguides cannot practically achieve the large modal areas necessary for next generation applications, which, using the teachings herein, are now realizable, using the design rules described herein to realize fibers with field-flattened, single HOM configurations.

SUMMARY OF THE INVENTION

It is an object of the invention to provide a systematic method for designing waveguides that propagate a single, patterned, field-flattened mode.

Another object is to provide waveguides that propagate a patterned, field-flattened mode.

Yet another object is to extend the patterned flattened-mode concept to hexagonal geometries of uniform refractive index packed into hexagonal arrays. By changing the refractive index or thickness of a nominally hexagonal coating's layers along its perimeter, pure stack-and-draw methods can create strands and shells that are sufficiently flat for patterning, opening an attractive path to their fabrication.

Still another object is to extend the patterned flattened-mode concept to that based on cells having circular cross-sections, including, but not limited to, cells comprised of air-holes or materials mixed or inserted into the cells to tune the local average index.

Other objects will be apparent to those skilled in the art based on the disclosure herein.

Embodiments of the present waveguides consist of field-flattening strands located inside an encompassing field-flattening shell. The method can be applied to form modes that are more bend-tolerant than conventional modes of comparable size, or more tolerant of nonlinear defects such as nonlinear self-focusing. By applying this invention, the field of the patterned flattened mode can be made more robust to nonlinear propagation defects, and can be made to propagate at a speed that differs significantly from the speeds of its neighboring modes (when compared to the differences that naturally arise in conventional waveguides). The flattened field and/or larger speed differentials also make the higher order mode easier to cleanly excite than the same mode in a conventional guide. Other benefits are that the stitched high order mode waveguide can be designed to pack the power it guides very efficiently, and can be designed to avoid problematic hot spots in the field.

Exemplary uses of the invention include (i) the creation of rare earth-doped optical fibers having larger modes than can currently be manufactured and conveniently deployed, in order to allow lasers and amplifiers made from such fibers to handle increased power levels and pulse energies and (ii) the creation of large mode optical fibers to route very high laser powers or pulse energies within a structure. Other uses include (i) the creation of very large mode optical fibers for propagating telecommunications signals, where the large mode size allows stronger pulses to be propagated without incurring nonlinear artifacts, and to thus allow an increase in the spacing of repeaters in a communications network and (ii) the creation of optical fibers with aesthetically pleasing or unique modal structures to cosmetically differentiate products, or for entertainment or display purposes.

The waveguides described here are presumed to be made of glass or of a material that allows light, having the wavelength of interest, to propagate a suitable length for its intended application without undo attenuation. For optical fiber amplifiers, a suitable length might be tens of meters, with attenuation less than one-tenth of a decibel per meter.

The parent application, U.S. patent application Ser. No. 13/162,351, filed Jun. 16, 2011, titled "Optical Waveguides Having Flattened High Order Modes," incorporated herein by reference, describes methods for designing and manufacturing axially-symmetric waveguides that propagate a high-order, field-flattened mode—a mode with regions in which the field does not vary with azimuth or radius. It is believed that the structures placed into these guides better confine large modes and allow a mode's preferential guiding properties, such as its bend tolerance, to be tailored and better maintained as the guided mode size is increased.

Key features of the embodiments discussed herein include the following: The flattened modes do not suffer potentially problematic hotspots, they inherently pack the propagated power into a compact cross-section, and they may reduce a mode's susceptibility to some artifacts such as nonlinear self-focusing. In an amplifier, they allow power to be extracted uniformly and efficiently across the mode's cross-section. Furthermore, in amplifier applications, the stitching and termination groups would not likely be doped with rare-earth ions, allowing for better control of their indices, and since the field of the flattened mode is near-zero in those regions, avoiding leaving regions of unsaturated gain that might contribute to noise or amplification of undesired modes.

In the embodiments below, we have qualitatively considered the bending properties of the flattened high-order modes by inspecting the transverse structure of the neighboring mode that they would couple to, and find that the flattened modes will stay well-centered. Quantitative bend-loss studies are in progress.

Comparisons to the high-order modes of a step-index fiber are complicated by the fact that the effective area, as conventionally defined, does not account for hotspots in a mode's peak irradiance. We have used the effective area metric here, but suggest that in some applications it may give an overly optimistic representation of the performance of high order step-index modes. Despite applying this possibly lenient metric, the high-order mode of the step-index example fiber is less attractive than the flattened modes in terms of intermodal spacing, peak irradiance, and the compactness of its mode. While increasing the v-number of the step-index design would improve the intermodal spacing, it would also increase its mode count, accentuate its central hotspot, and further reduce its mode's packing density.

In principle, flattened high-order modes could be manufactured with conventional telecom techniques such as modified chemical vapor deposition and outside vapor deposition, but the tighter manufacturing tolerances allowed by holey-fiber construction techniques may prove, however, to be preferable or necessary.

BRIEF DESCRIPTION OF THE DRAWINGS

The accompanying drawings, which are incorporated into and form a part of the disclosure, illustrate embodiments of the invention and, together with the description, serve to explain the principles of the invention.

FIG. 3A illustrates an exemplary configuration of a tiling configuration that is possible using the teachings herein. Note the asymmetry of the modal pattern.

FIG. 3B illustrates another exemplary configuration of a tiling configuration with a pair of strand regions that is possible using the teachings herein.

FIG. 3C illustrates yet another exemplary configuration of a tiling configuration with six identical strand regions that is possible using the teachings herein.

FIG. 3D illustrates still another exemplary configuration of a tiling configuration with six strand regions, two of which have fields with opposing polarities that is possible using the teachings herein.

FIG. 3E illustrates another exemplary configuration of a tiling configuration with strands of differing diameters that is possible using the teachings herein.

FIG. 13A shows a notional strand-preform formed by photonic crystal stack-and-draw techniques.

FIG. 13B shows strand-canes drawn from a photonic crystal strand-preform.

FIG. 13C shows strand-canes stacked inside a shell consisting of appropriately arranged glass rods that form a field-flattened shell in the final drawn optical fiber.

FIG. 13D shows a fiber drawn from the preform of FIG. 13C.

DETAILED DESCRIPTION OF THE INVENTION

Long distance telecommunications links and high power fiber lasers tend to be limited by nonlinear propagation artifacts or laser induced damage. The thresholds for most defects can be raised by spreading the power a guide carries over a large area, and recent papers present fiber designs that address the issue, including flattened-mode fibers (see ref 1), higher order mode fibers (see ref 2), multi-core fibers (see refs. 3 and 4), and other promising approaches (see refs. 5 and 6).

A recent paper (see ref 7) describes fibers that propagate a higher order, field-flattened mode consisting of one or more field-flattened annular rings. The radially varying structure is especially effective at altering the area-spacing products between circularly symmetric modes, and thus allows for larger mode sizes without increasing the risk of symmetric-mode cross talk. Those flattened higher order modes have two potential drawbacks, however. First, the effective index of the bend-coupled mode, the mode that predominantly couples with the flattened mode on bending, is not readily manipulated. Second, the guides' manufacturing complexities grow with the number of added rings and thus with mode size.

We show here that the concentric structures of reference 7 can be positioned arbitrarily within an encompassing flattened shell without altering the effective index or flattened nature of the shell's mode. The structures do alter the characteristics of other modes, though, allowing for independent adjustments of the flattened and non-flattened modes.

We also show that a hexagonal array of structures increases the area-spacing differential between the guide's flattened mode and its bend-coupled mode by more than a factor of three, compared to a step-index fiber, allowing for a larger or more-bend tolerant mode.

Finally, we suggest that patterned modes lend themselves to economical stack-and-draw procedures.

Figure 1:
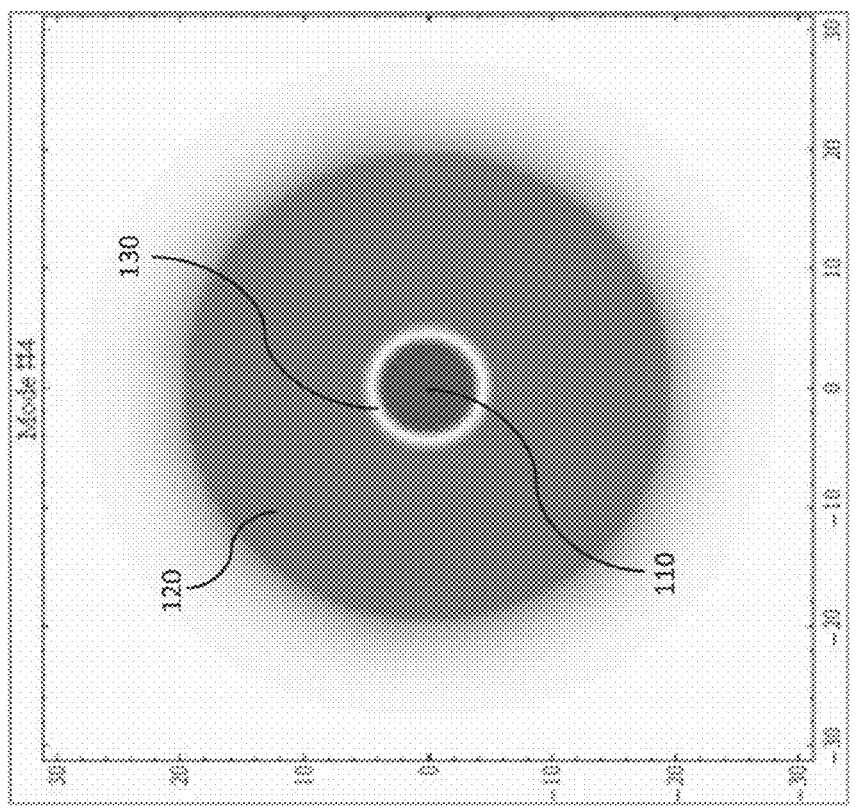
FIG. 1 illustrates the field distribution of a mode of the type described in the parent application (prior art).

FIG. 1 illustrates the electric field distribution, at some instant in time, of a mode of the type described in the parent application (prior art). In the figure, the central (dark grey) region 110 designates positions where the field is positive, the outermost (light grey) region 120 designates positions where the field's polarity is negative, and the narrow annular (white) region 130 designates positions where the field is zero. The relative shades of grey in the figure designates the relative magnitude of the field—for example, far from the center of the concentric circles, the grey level is relatively light, while at positions closer to the center the grey level is relatively dark; correspondingly, the magnitude of the field is diminished in the positions of lighter shades of grey relative to the positions of darker shades of grey. In FIG. 1, the magnitude of the fields at the darkest grey positions within region 110 and the darkest grey positions within region 120 is the same; the fields differ only in polarity. A key feature of these teachings is that the magnitude of the field within the central region 110, as well as the magnitude of the field within the annular region 120, each does not vary substantially with position—these are so-called "field-flattened" regions, as described in the parent application.

A physical waveguide structure, which enables the propagation the electric-field mode of FIG. 1, is comprised of a first index structure placed around the outer boundary of an annular field-flattened region 120—referred to as a "terminating region"—and, further, is comprised of a second index structure placed in region 130, referred to as a "stitching region," which lies between a central field-flattened region 110 and an outermost field-flattened region 120. Structures of this type, consisting of a terminating region and one or more stitching regions, allow for greater design flexibility than that allowed by conventional fiber structures, and form the basis of the parent application (the prior art).

However, the resulting higher-order flattened modes, as taught in the prior art, cannot vary with azimuth, an inherent constraint. As a result of the limitations of the prior art, certain guiding properties might better be, or may only be, manipulated in modes whose field also varies with azimuth.

The present inventors have devoted significant effort to devising a method for making flattening structures that allow for azimuthally-varying flattened modes; until recently, without success. The present inventors have now discovered the following.

To make the invention clear, it is helpful to first define the terms "shell" and "strand," as used here. For simplicity, the following definitions consider a cylindrically symmetric geometry, though the shells and strands may also be defined for other geometries. A field-flattened shell, or shell, is a cylindrically-symmetric refractive index structure that consists of a single field-flattening region of circular cross-section, surrounded by a terminating region of circular annular cross-section. A field-flattened strand, or strand, is a cylindrically-symmetric refractive index structure contained within a shell, and consists of a single field-flattening region of circular cross-section surrounded by a stitching region of circular annular cross-section.

By the teachings of the parent application, a strand may be inserted inside a shell without altering the effective index or flattened nature of the shell's field-flattened mode, provided three conditions are met: one, the field-flattening regions of the strand and shell have the same refractive index; two, the strand and the portion of the shell's field-flattening region that it displaces have the same cross-sectional area; and three, the strand is placed concentrically within the shell.

The present authors now realize that the third constraint, though it simplifies the analysis of the problem, is not a necessary condition, for the following reason. Since the pertinent parameters of the field—its magnitude and gradient—do not vary inside the shell, all points within the shell are, from the perspective of the strand, equivalent, and thus any strand allowed at the center of the shell is allowed, at any position, within the shell that it fits. Moreover, multiple strands, of various sizes and designs, may be fitted within the shell, thus creating patterned, flattened modes.

Four points bear emphasis. First, the internal structures are designed in a concentric geometry, where we can take advantage of the mathematical simplifications and well-known mathematical functions (Bessel functions) that describe the field and its slope. Moreover, once these structures are determined, they may be moved anywhere within the outer flattened guide. Hence, they are not limited to be concentrically positioned. Second, this philosophy can be applied in manufacturing as well; a concentric flattened basis structure can first be formed and then physically stacked within an outer flattened guide. Third, the patterning preserves the properties of the flattened mode, but not other modes, allowing the desired mode to be discriminated from other modes. Fourth, the internal patterning structures may touch, but do not need to touch. Early indications are that as the number of structures within the encompassing guide is increased, the bend-tolerance of the desired mode is enhanced.

Figures 2A, 2B, 2C:
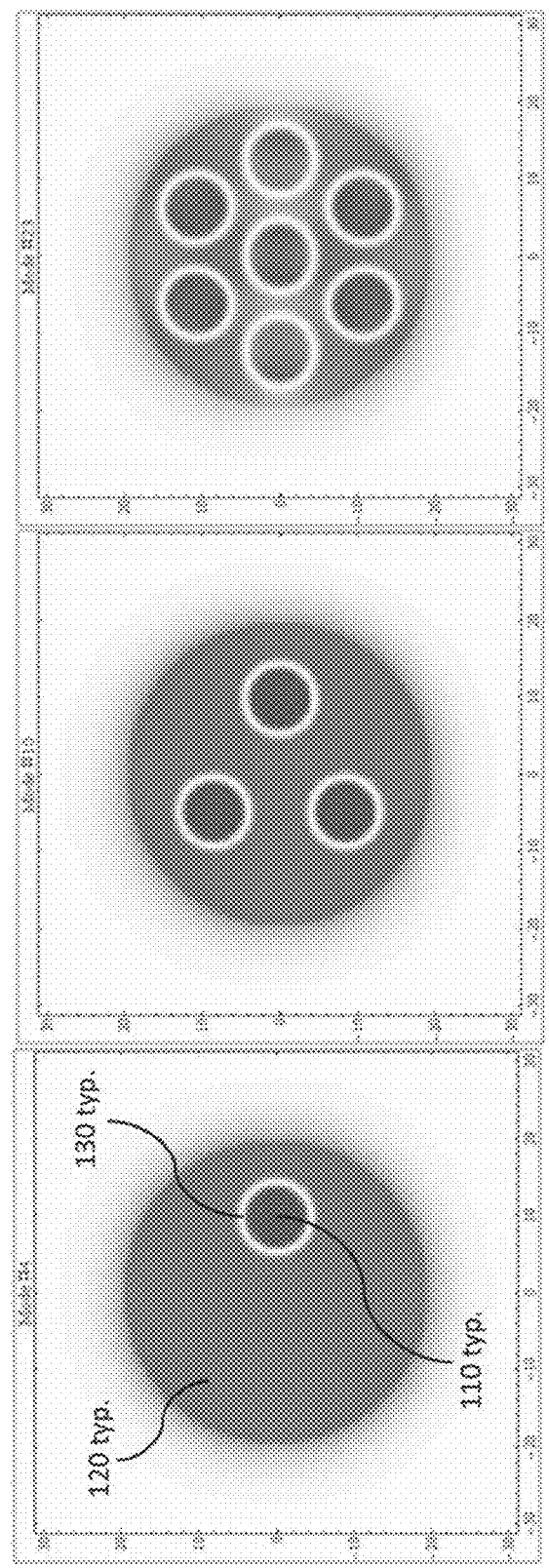
FIG. 2A depicts a transverse field profile of a field-flattened mode, in which case, the central structure (strand) of the mode of FIG. 1 is moved off-center
FIG. 2B depicts a transverse field profile of a field-flattened mode, in which case, the central structure (strand) of the mode of FIG. 1 is replicated and tiled three times.
FIG. 2C depicts a transverse field profile of a field-flattened mode, in which case, the central structure (strand) of the mode of FIG. 1 is replicated and tiled seven times.

FIGS. 2A, 2B and 2C illustrate several examples of electric-field mode distributions, which are now possible using the teachings of this invention. These modal patterns follow the same reference numbers and descriptions as those of FIG. 1. The field distributions in all these cases were calculated via a standard mode-solver algorithm. The three examples illustrated here are of increasing complexity, in terms of the number of field-flattening regions.

FIGS. 3A, 3B, 3C, 3D and 3E illustrate several other exemplary configurations of the multitude of "tiling" configurations that are possible using the teachings herein. In this set of figures, the field profiles are not calculated; rather, the figure illustrates notional possibilities. These modal structures follow the same reference numbers and descriptions as that of FIG. 1. Note that in FIG. 3A, the modal pattern is asymmetric, with the respective secondary and tertiary modal features, 310 and 320, respectively, both positioned off-axis; and, moreover, with the two respective terminating regions, 330 and 335, both in direct contact with each other at a single tangential point. FIG. 3B illustrates a configuration comprised of a pair of identical field-flattening regions. FIG. 3C illustrates a configuration comprised of six identical field-flattening regions, 340. FIG. 3D illustrates a configuration similar to that of FIG. 3C, but, in this example, two of the diametrically opposed field-flattening regions, 350, are each of opposing polarities relative to the four other field-flattening regions, 340, as well as a seventh central field-flattening region 360. FIG. 3E illustrates a configuration comprised of an ensemble of field-flattening regions of differing diameters, with three identical field flattening regions, 370, of relatively large diameters, interspersed with three identical regions, 380, of a smaller diameter, and, with a central region, 390, of a yet smaller relative diameter. These examples are, by no means exhaustive, and, represent but a sampling of more general class of field configurations possible using the teachings herein. All these configurations are unanticipated by, and clearly beyond the limitations, of the prior art.

DEFINITIONS

In what follows, we present definitions of scaled pattern and modal parameters, which are utilized in the structural configurations and field-pattern algorithm calculations. The scaled parameters here follow the conventions and notations used in Reference 7.

Scaled Quantities.

A characteristic numerical aperture of a waveguide, $NA_{flat}$, is defined as:

$$NA_{flat} = \sqrt{n_{flat}^2 - n_{clad}^2} \quad (1)$$

where $n_{clad}$ is the refractive index of the cladding and $n_{flat}$ is the index of the layer or layers over which the field is to be flattened. The respective scaled radial and Cartesian coordinates, $v$ and $v_x$, respectively, are defined as:

$$v = \frac{2\pi}{\lambda} r NA_{flat} \quad (2A)$$

$$v_x = \frac{2\pi}{\lambda} x NA_{flat} \quad (2B)$$

where $\lambda$ is the wavelength of the guided light, and r and x (alternately y) are the radial and Cartesian coordinates, respectively.

In cases where a strand is surrounded by a thin coating—the normalized index of such cells that comprise the strand's perimeter—is given by the approximation:

$$\Delta v_x \sqrt{\eta - 1} \cong m\pi \quad (2C)$$

where $\Delta v_x$ is the coating's normalized thickness and the integer m corresponds to the number of times the field's polarity changes sign within the coating.

The scaled refractive index profile, $\eta(v)$, is defined as:

$$\eta(v) = [n^2(v) - n_{clad}^2]/NA_{flat}^2 \quad (3)$$

For the flattening waveguides described here, $NA_{flat}$ is assumed to be the minimum value that can be reliably controlled. In the following examples, η ranges between ±10, which is reasonable for germanium and fluorine doped silica, when $NA_{flat}$ is roughly 0.06.

The examples here list a mode's scaled effective area, $A_{scaled}$, which is related to its effective area, A, by:

$$A = \left(\frac{\lambda}{2\pi NA_{flat}}\right)^2 A_{scaled} \quad (4)$$

For a conventional, single-mode step-index fiber (v=2.4), $A_{scaled}$=21.4.

If a waveguide's design is scaled in a manner that keeps its mode count fixed, that is, if $NA_{flat}$ is decreased in direct proportion to an increase in the guide's cross-section, then the following effective area-spacing product, $\Theta_{eff}$, is fixed [7]:

$$\Theta_{eff} = (n_{eff}^2 - n_{clad}^2) A_0/\lambda^2 \quad (5)$$

where $A_0$ is the effective area of a reference mode of the guide, which is, generally the flattened mode. For a step-index fiber, the difference between the area-spacing products of the fundamental mode, $LP_{01}$, and the mode it couples to on bending, $LP_{11}$, is $\Delta\Theta_{eff}$=0.29 for v=2.4, and asymptotically approaches 0.34 for larger v's.

Flattening Shell.

A flattening shell, or shell, supports a field-flattened mode. It consists of a field-flattening layer, namely, a layer in which the field's radial and azimuthal gradients are zero or nearly zero, surrounded by a layer or group of layers that terminate the flattened mode to the cladding. Note that the termination is analogous to impedance matching. The outer layers are referred to as the termination group or the shell's coating. The field might change sign in the shell's coating one or more times, or it might not change sign at all.

Flattening Strand.

A flattening strand, or strand, is a refractive index structure that possesses—at the effective index where an encompassing shell's field is flattened—a flattening field around its perimeter and usually has a flattening field in its interior. The layer, or group of layers, that flatten the perimeter's field is referred to as a stitching group or the strand's coating. The field might change sign in the strand's coating one or more times, or it might not change sign at all.

Patterned Modes.

Reference 7 shows that a concentric strand, or a series of nested concentric strands, may be placed inside a shell without altering the effective index or flattening nature of the shell's flattened mode. By definition, though, the gradient of the flattened mode's field is zero everywhere inside the shell and zero everywhere around the strand's perimeter. It follows, then, that any strand that can be situated at the shell's center can also be situated anywhere within the given shell without altering the flattened mode. This realization represents is a key observation, one with important implications for design in terms of the generalized flattening field design rules herein.

A single strand or multiple strands, of the same or different designs, may be placed inside a shell without altering the mode's effective index or flattened nature, provided each strand displaces a like amount of shell material. Strands do not have to touch each other or the shell, but may. Strands may be placed inside strands.

Though adding or moving strands does not alter the effective index or flattened nature of the flattened mode, they can alter the mode's group index and effective area, and adding strands typically also adds propagation modes to the guide. In many applications, these changes and compromises are acceptable, or can be made acceptable.

Adding or moving strands can significantly alter the effective index and shapes of the guide's non-flattened modes. The goal, then, is to place strands at positions that bolster the desired, flattened mode, while ameliorating problems associated with the non-flattened modes, or both concomitantly.

The structure of a shell or strand's coating is most easily determined in a concentric geometry, where symmetry allows for analytic solutions to the wave equation [7]. They may also be determined with a mode-solver, by trial and error. As discussed above, once the strand and shell configurations are determined, these elements can be repositioned anywhere within the overall structure, as determined for a given application.

In the examples that follow, Table 1 tabulates typical design parameters for the shell and strand regions using the definitions described above.

TABLE 1

Designs for the shell and strands used in the examples herein. All quantities are dimensionless.

| Layer | Shell $\Delta v/\pi$ | $\eta$ | Strand 1 $\Delta v/\pi$ | $\eta$ | Strand 2 $\Delta v/\pi$ | $\eta$ |
|---|---|---|---|---|---|---|
| i | 2.000 | 1 | 0.539 | 1 | 0.250 | 1 |
| ii | 0.077 | 10 | 0.135 | 10 | 0.153 | 10 |
| iii | 0.067 | −10 | 0.124 | −10 | 0.122 | — |
| iv | — | — | 0.103 | 10 | 0.096 | 10 |

Modal Pattern Simulations

Example 1

Shell with a Single Strand

Figure 4:
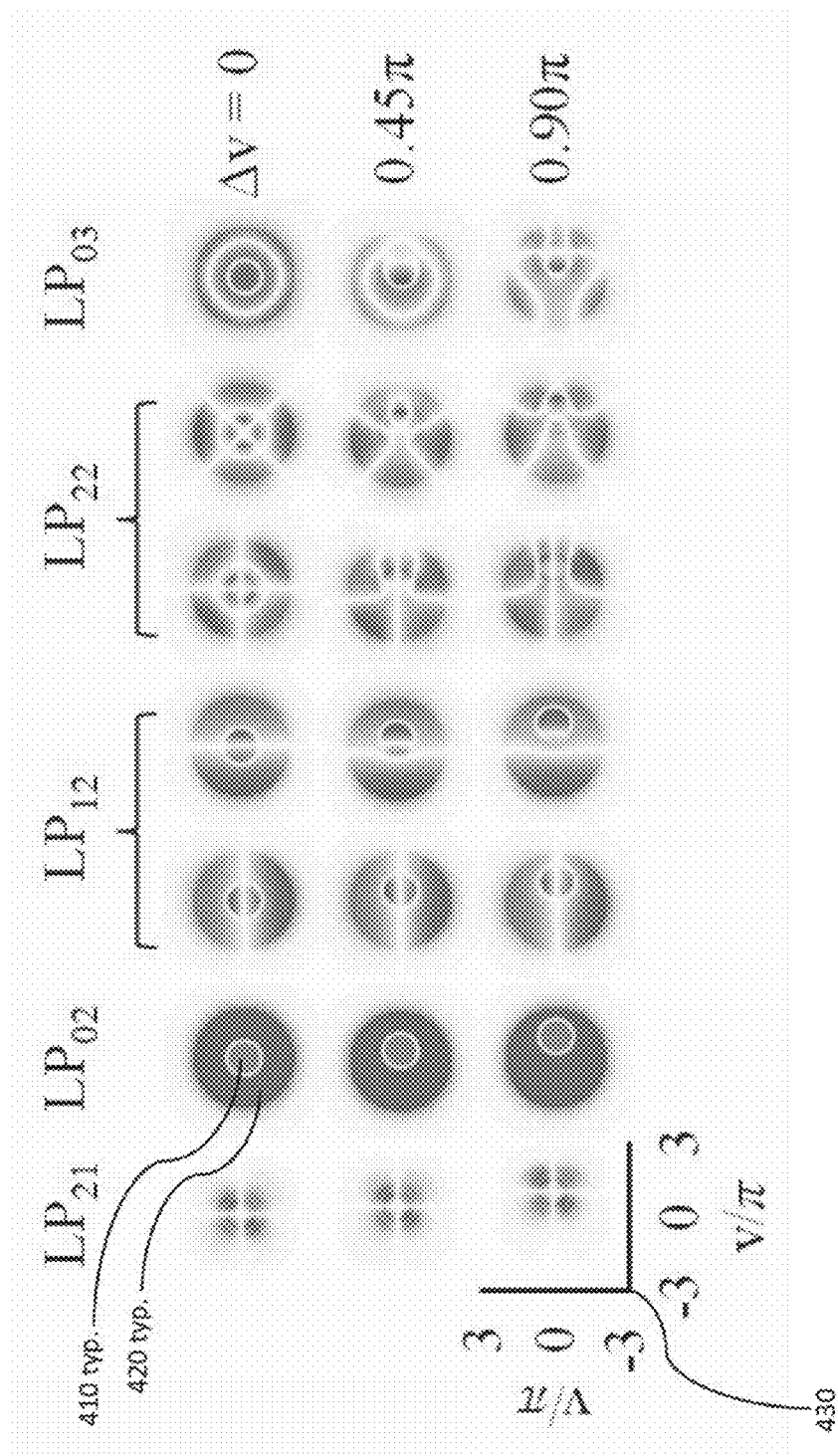
FIG. 4 shows transverse field (not irradiance) distributions of representative modes of the fiber described by the Shell and Strand 1 of Table 1.

Turning now to FIG. 4, we show results of transverse field (not irradiance) profiles of several representative modes of a waveguide comprised of the Shell and Strand 1 parameters listed in Table 1. In this case, a single shell is filled with a single strand.

As depicted in the modal patterns of FIG. 4, field-flattened regions 410 and 420, respectively, represent different polarities of the field, and the grey-level shading corresponds its relative amplitude. The effective index decreases from the left column to the right, and the strand's shift increases from the top row to the bottom. All modal patterns are spatially scaled per the lower-left set of (scaled) axes, 430, and all quantities are dimensionless.

In the figure, each of the seven columns (each showing three patterns) corresponds to a specific modal field order ($LP_{21}$, $LP_{02}$, $LP_{12}$, $LP_{22}$ and $LP_{03}$). On the other hand, each of the three rows (each showing seven patterns) corresponds to modes for three different (and, increasing) radial offsets of the strand, $\Delta v$=0, 0.45$\pi$ and 0.90$\pi$. As an example, the top row ($\Delta v$=0) corresponds to a fiber comprised of a symmetrically and concentrically positioned, single coaxial strand.

The scaled cross-sectional effective area, [Eq. (4)], of the flattened mode is 142, which is greater than six times that of the scaled area of a conventional telecom-like fiber. This large increase in the scaled area validates the contention that a field-flattened fiber can support a mode of greater transverse extent than that of conventional telecom fibers.

As the strand is progressively positioned farther off center (as shown in FIG. 4 by the progression from row 1 to row 2 to row 3), the position of the ring of the flattened $LP_{02}$ mode moves in concert with it. In spite of this offset, as discussed above, the flatness of the desired irradiance pattern (the $LP_{02}$ mode) does not change materially, which is desired, whereas, the shapes of other modes do change to varying degrees.

Figure 5:
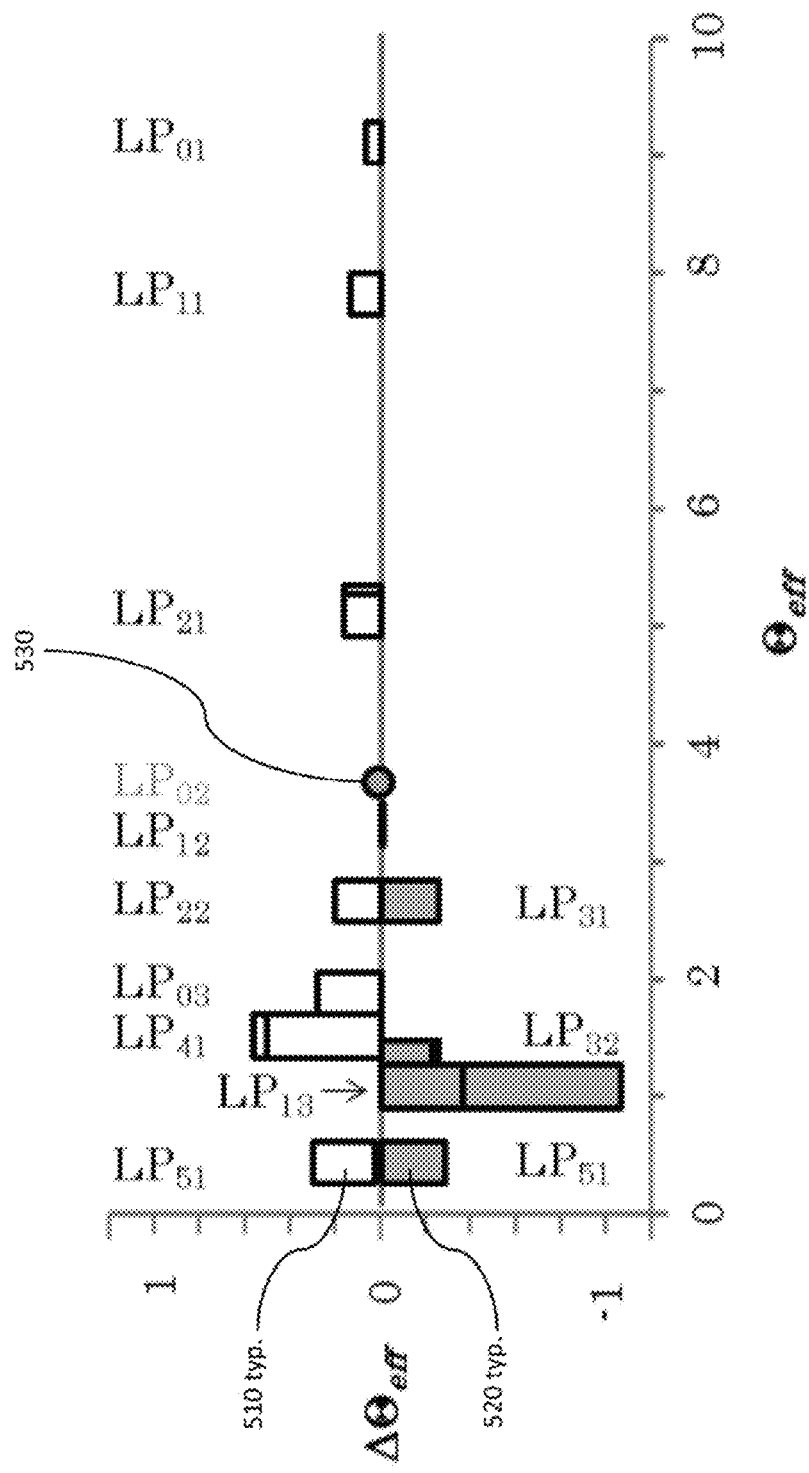
FIG. 5 shows the change in the effective area-spacing product of the guide's modes when the strand is moved from the center of the shell to its most extreme offset.

Turning now to FIG. 5, the change in the area-spacing product, $\Delta\Theta_{e\!f\!f}$ is plotted as a function of $\Theta_{e\!f\!f}$ [Eq. (5)], as the strand is progressively positioned from its concentric configuration ($\Delta v=0$) to a (normalized) radial offset of $0.90\pi$. All quantities are dimensionless. The figure shows the change in the effective indices of the guide's modes when the strand is moved from the center of the shell to its most extreme offset.

In FIG. 5, the white and grey filled bars, 510 and 520, respectively, designate a respective increase or decrease in $\Delta\Theta_{e\!f\!f}$ as the respective strand is offset over its range. The circle 530 located along the abscissa, at a value of $\Theta_{e\!f\!f} \approx 3.7$, designates the parameters in this plot that pertain to the desired field-flattened $LP_{02}$ mode. As expected, the area-spacing product, $\Delta\Theta_{e\!f\!f}$ for the $LP_{02}$ mode essentially remains constant (i.e., invariant), regardless of the amount of radial offset of the strand. That is, the field-flattened mode does not shift but the other modes do, with the higher-order modes (smaller $\Theta_{e\!f\!f}$'s) shifting the most. Some modes, such as the $LP_{13}$ and $LP_{51}$, become non-degenerate as the strand shifts. Comparing FIG. 4 and FIG. 5, it is seen that the modes that shift more are distorted more, which is physically reasonable.

The separation between the area-spacing products, $\Delta\Theta_{e\!f\!f}$ of the flattened mode, $LP_{02}$, and its bend-coupled mode, $LP_{12}$, does not change significantly when the strand is moved off-center. The difference remains roughly $\Delta\Theta_{e\!f\!f} \approx 0.36$, which is about the same as the analogous spacing for a step index fiber, suggesting that the single strand has little impact on the guide's bend behavior. The multi-strand design of the following example shows a more marked change, though.

Example 2

Shell with Seven Strands

Figure 6:
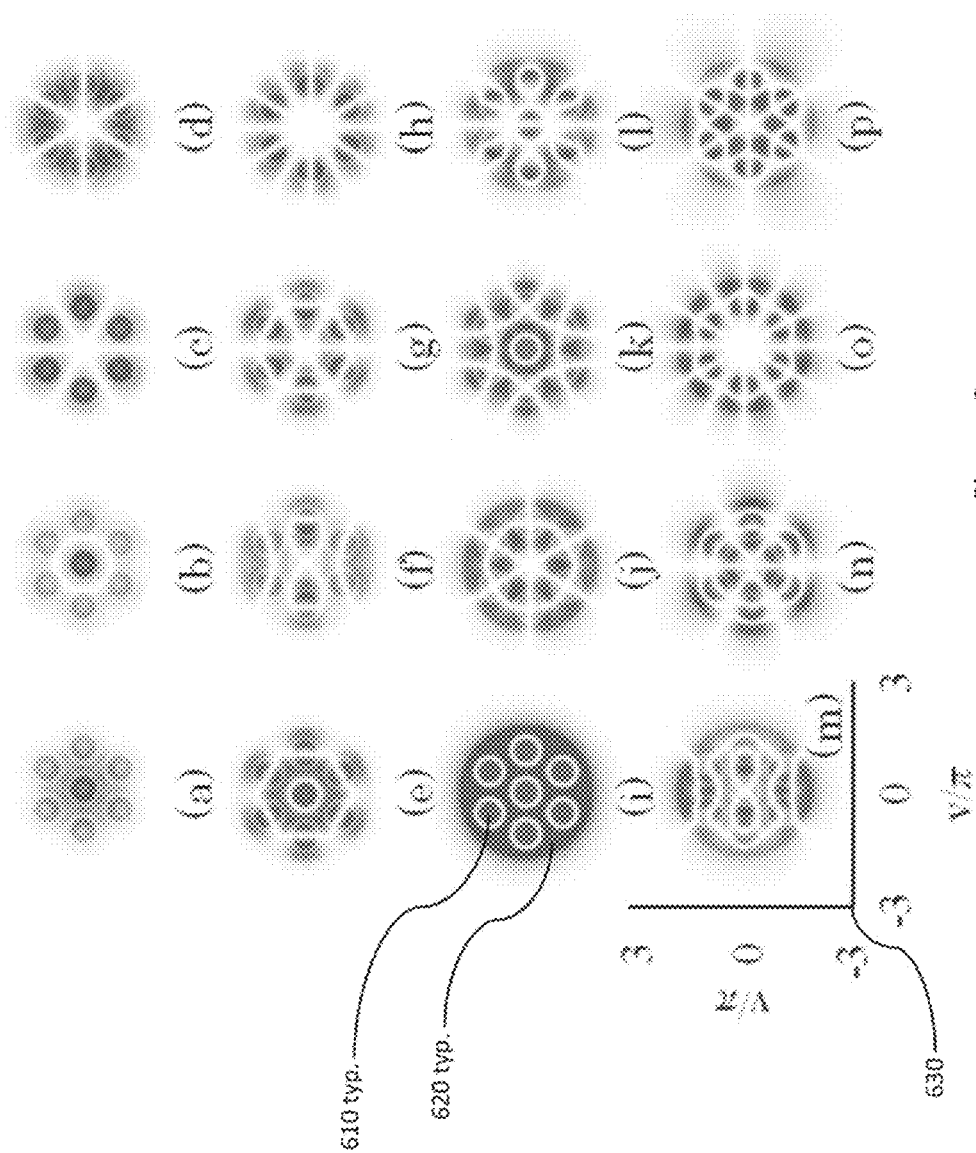
FIG. 6 shows transverse field distributions of representative modes of the Shell and seven strands of Strand 2 of Table 1.

Turning now to FIG. 6, we show transverse field distributions (not irradiance profiles) of sixteen representative modes of a waveguide comprised of the Shell and Strand 2 parameters listed in Table 1. In this case, a single shell is filled with seven strands.

As depicted in the modal patterns of FIG. 6, field-flattened regions 610 and 620, respectively, represent different polarities of the field, and the grey-level shading corresponds its relative amplitude. All modal patterns are spatially scaled per the lower-left set of (scaled) axes, 630, and all quantities are dimensionless.

FIG. 6 also shows the transverse field profiles of 16 of the 28 non-degenerate modes allowed by a waveguide comprised of the Shell and seven strands of Strand 2 listed in Table 1. One strand is placed at the guide's center and six are placed at a radial distance of $\Delta v=1.3\pi$ at 60° increments. For mode (i) the field's polarity changes sign from the center of the shell to the center of the strands, but the irradiance, that is, the field squared, is essentially flat. The scaled area, [Eq. (4)], of the flattened mode is 121, slightly less than six-times the scaled area of a telecom-like fiber. As is the case of the single-strand fiber (recall, Example 1 above), this new class of fiber can support much greater modal areas than conventional fibers. In addition, this fiber is less susceptible to bending losses than that of conventional fibers as well as single-strand field-flattened fibers, as we discuss below.

TABLE 2

Designations and area-spacing products [Eq. (5)] for the modes illustrated in FIG. 6. All quantities are dimensionless.

| Mode | Designation | $\Theta_{e\!f\!f}$ |
|---|---|---|
| (a) | $LP_{01}$ | 10.5 |
| (b) | $LP_{02}$ | 9.4 |
| (c) | $LP_{31}$ | 9.2 |
| (d) | $LP_{31}$ | 6.8 |
| (e) | $LP_{03}$ | 6.2 |
| (f) | $LP_{22}$ | 5.4 |
| (g) | $LP_{32}$ | 5.1 |
| (h) | $LP_{61}$ | 4.0 |
| (i) | $LP_{04}$ | 3.1 |
| (j) | $LP_{32}$ | 3.0 |
| (k) | $LP_{62}$ | 2.8 |
| (l) | $LP_{14}$ | 2.0 |
| (m) | $LP_{23}$ | 1.9 |
| (n) | $LP_{33}$ | 1.4 |
| (o) | $LP_{62}$ | 0.25 |
| (p) | $LP_{33}$ | 0.10 |

Table 2 lists analogous $LP_{mn}$ modal-order designations, which correspond to the labeled patterns in FIG. 6 [(a) through (p), inclusive]. Table 2 also tabulates the area-spacing products, $\Theta_{e\!f\!f}$ [Eq. (5)], for the modes of FIG. 6. Note that the degeneracy of some modes is broken. In the example fiber, the $LP_{31}$ pair is largely separated in $\Theta_{e\!f\!f}$, as are other pairs with three and six azimuthal lobes.

Upon fiber bending, the field-flattened $LP_{04}$ mode, labeled as "(i)" in FIG. 6, tends to couple to the $LP_{14}$ mode, labeled as "(l)" in the figure. However, it is seen from Table 2 that the area-spacing product, $\Theta_{e\!f\!f}$, of the flattened $LP_{04}$ mode is separated from that of its bend-coupled mode, the $LP_{14}$ mode, by $\Delta\Theta_{e\!f\!f}=1.1$, which is 3.2 times larger than the analogous spacing for a step index fiber. Thus, the area of the field-flattened $LP_{04}$ mode in FIG. 6 may be increased by this factor, while maintaining a large area-spacing product difference between it and its bend-coupled mode, far exceeding that of the analogous separation for a telecom fiber. Thus, using the teachings herein, the field-flattened mode is more robust, vis-à-vis a large modal guiding area, as well as minimal deleterious bending-induced mode mixing, relative to a standard telecom fiber.

The modes depicted in FIG. 4 and FIG. 5 were determined with an in-house solver under the weak-guiding approximation. The fields of the flattened mode of FIG. 6 were additionally analyzed in COMSOL, without the need for the weak-guiding approximation. The refined analysis shows that the field is linearly polarized, though the direction of polarization changes sign from the interior of the shell to the interior of the strands. The field lines curve slightly at the shell and strand boundaries but are otherwise straight, justifying the weak-guiding approximation.

Flattened modes have many advantages, the most notable being that they pack power optimally and are free of hot and cold spots, that is, regions where the local irradiance greatly exceeds the mode's average value, and regions where the preferred mode cannot fully extract a guide's gain.

Field-flattening strands can be moved or duplicated within a field-flattened shell to create patterned, flattened modes. Patterning does not alter the effective index or flattened nature of the mode, but does alter the effective indices and shapes of other modes.

In the hexagonal packing example presented here, the separation between the flattened mode's area-spacing product and that of its bend-coupled mode is more than three times larger than the separation for a step index fiber, suggesting that its mode may be made three-times larger without increasing the likelihood of bend-coupling.

For the examples presented here, form birefringence is negligible and the mode's flatness does not vary significantly over a bandwidth of 10% of the center wavelength. Studies of the effect of patterning on group index, chromatic dispersion, and bend loss are currently being pursued.

In terms of fabrication, a precursor preform could be drawn to canes, which are then stacked to create an economical multi-strand preform. The number of strands that can be added to a shell will depend on a manufacturer's ability to control the flatness of the field around the strands and the flatness of the field inside the shell.

In summary, we note that the field does not change sign at the point between circles. For such designs, the central strand must remain in the structure, because it shares walls with adjacent strands. Though the index profile has a kagome pattern, the flattened mode is an arrangement of hexagonally-packed circles, which, to those skilled in the art, is counterintuitive. In addition, myriad shell and strand shapes are possible. For example, it is possible to separate the strands by multiple cells (in the above example, they share cells). Though not discussed here, the mode spacing is slightly improved. Furthermore, the patterned mode may have interesting properties when twisted at a uniform rate, or back and forth at some resonant frequency.

Patterned Flattened Modes on a Hexagonal Grid

In the above-mentioned embodiments, it has been shown that the field-flattened strands and shells can be configured so that the former can be placed and arranged within the latter without altering the propagation constant or flatness of the preferred, field-flattened mode (note that the strands do, in principle, alter the properties of other modes, which are not of material importance for single-mode operation).

That analysis, though exact, is limited to strands and shells having circular cross-sections. While a circular geometry is amenable to traditional telecom fabrication methods—where cane-like strands might be drawn from vapor-deposited preforms and packed inside a tube whose interior wall has been vapor-coated with a shell—it is not an obvious fit for the pure stack-and-draw methods of photonic-crystal fibers, which generally lead to hexagonal geometries. Pure stack-and-draw methods may be preferable, though, as they allow for designs that are more intricate and have a large refractive index contrast. High contrast allows thin coatings on strands and shells, making for efficient use of space within the guide.

There is a desire, then, to extend the patterned flattened-mode concept to hexagonal geometries. In the embodiments that follow, it is shown, that by changing the refractive index or thickness of a nominally hexagonal coating's layers along its perimeter, traditional stack-and-draw methods can create strands and shells that are sufficiently flat for patterning, opening an attractive path to their fabrication.

One exemplary embodiment is based on hexagonal cells of uniform refractive index packed into hexagonal arrays. The other is based on cells having circular cross-sections, which can be in the form of air holes or materials mixed or inserted into the cells to tune the local average index. Arrays may also be stacked into other symmetries.

The analysis herein is similar to that described above with respect to fiber elements of circular section (strands, shells, terminating layers, etc.), but, now, utilizing elements with hexagonal geometries and cross sections. The quantities and parameters used in the modeling and simulations of the hexagonal structures involve the cell's characteristic numerical aperture, $NA_{flat}$, as defined in Eq. (1); the normalized transverse positions, $v_x$ and $v_y$ [Eq. (2B)]; the coating's normalized thickness, $\Delta v_x$ [Eq. (2C)]; and the cell's normalized index, $\eta$ [Eq. (3)]. In regions where the field is flat, the normalized index, $\eta$, and the mode's effective index, $\eta_{eff}$, are both equal to one. In the modal analysis herein, the coatings on the strands and shells are assumed to be comprised of a single layer, though the index of the cells in that layer may vary with position.

The starting-point strand is placed (mathematically) inside an ideal circular shell where the field of one mode is, without the strand, perfectly flat. The field of the perturbed waveguide is then analyzed with commercial finite-element software (COMSOL® in conjunction with MATLAB®) and the indices of the cells in the strand's coating are varied to optimize a figure of merit. The code tracks modes near the target eigenvalue ($\eta=1$) without considering the symmetry of the solution. At times, the mode having the eigenvalue closest to $\eta=1$ is not the mode sought, in which case, the desired patterned, flattened modes are unipolar within shell and strand regions. The solver consequently works best when the starting design supports a mode that is already approximately flat. Our approach, then, is to first build (mathematically) flattened, hexagonally-gridded shells and strands, and then to combine and refine these into the desired modes.

With the variation of the indices, it may turn out that the desired mode (which can be identifiable by eye due to its symmetry) is not the mode closest to the eigenvalue target, nor may it be the flattest. As a result, optimization using a merit function, based only on effective index and intensity flatness, can suffer discontinuities and become trapped in local minima not corresponding to the desired mode. For this reason, the optimization is carried out using the Nelder-Mead simplex algorithm (implemented as '$f_{minsearch}$' in MATLAB), rather than a gradient-descent method. Furthermore, one can construct the merit function as a weighted combination of the normalized index error, the RMS intensity variation in the nominally flat regions, and other quantities relating to changes of the mode field's sign, that are sensitive proxies to deviations from the desired mode. With this approach, the optimization can remain constrained to the mode of interest, allowing its intensity flatness and normalized index to be jointly optimized, even if many indices in the structure are varied.

Figures 7A, 7B:
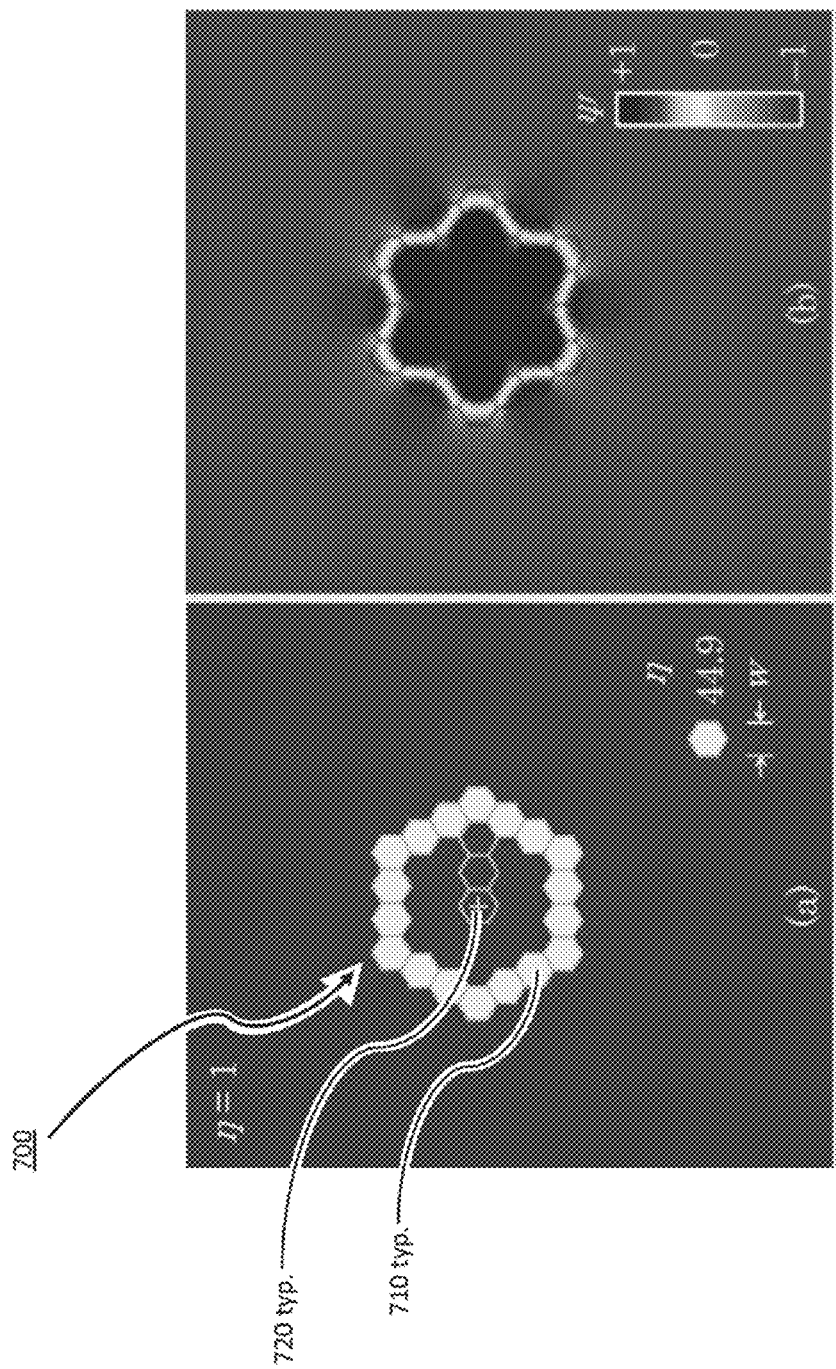
FIG. 7A shows a hexagonal strand whose coating has a uniform refractive index.
FIG. 7B shows the field of the flattened mode in the vicinity of the strand using the design of FIG. 7A.

Two slightly different strand designs have been explored to gain insight into the use of hexagonal geometries for field-flattened modes. FIG. 7A shows one example of an optimized hexagonal strand design 700. In this design, the refractive index of all the hexagonal cells 710 that comprise the perimeter of overall strand structure are identical and uniform. Moreover, in this design, the index inside the strand is the same as the index outside the strand, and the coating of the perimeter cells all have the same index and width. For clarity, FIG. 7A outlines only a few of the interior cells 720. FIG. 7B shows simulation results of the field-flattened mode in the vicinity of the strand for this choice of design rules. This plot depicts the transverse scalar field, $\psi$, of the flattened mode, both inside and near the strand, on the same transverse scale. After optimization, the mode's effective index fell slightly, $\eta_{eff\,error}=3.3\times10^{-3}$; its 'flat' RMS relative intensity variation increased to 0.22; and its relative peak intensity rose to 2.0 (ideally, these respective values should be 0.0, 0.0 and 1.0). Note that the zero-field node around the strand's perimeter is starfish-shaped.

Figures 8A, 8B:
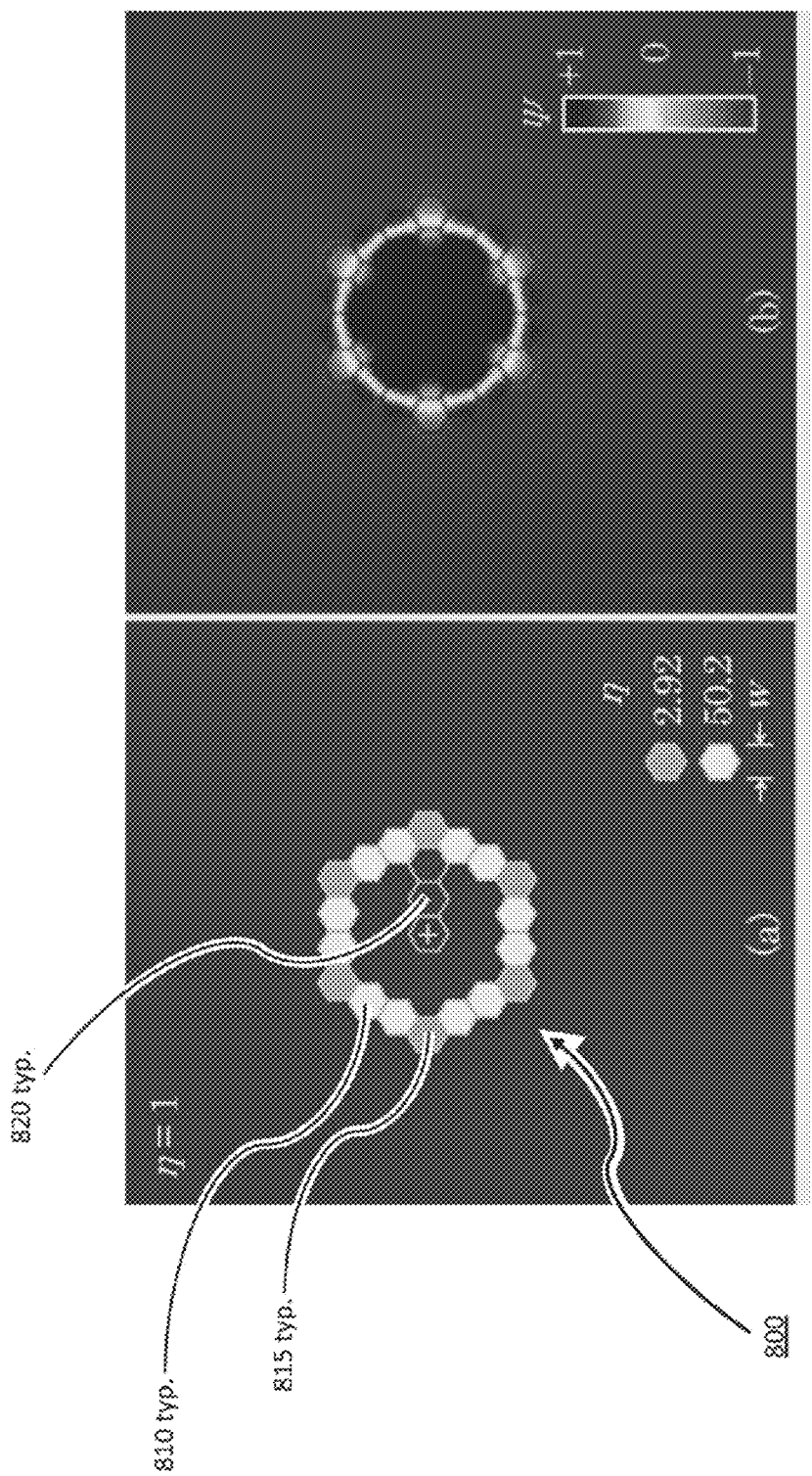
FIG. 8A shows a hexagonal strand in which the indices of the corner cells differ from those along the hexagon's sides.
FIG. 8B shows the field of the flattened mode in the vicinity of the strand using the design of FIG. 8A.

FIG. 8A shows a second example of an optimized hexagonal strand design 800. In this design, the indices of the corner cells 815 differ from those along the hexagon's sides 810. As is the case of the first example, the index inside the strand is the same as the index outside the strand, and the coating of the perimeter cells all have the same index and width. For clarity, FIG. 8A outlines only a few of the interior cells 820. FIG. 8B shows simulation results of the field-flattened mode in the vicinity of the strand for this choice of design rules. This plot depicts the transverse scalar field, $\Psi$, of the flattened mode, both inside and near the strand, on the same transverse scale. In this design, after optimization, the flattened mode's effective index error is $\eta_{\mathit{eff\,error}}=4.2\times10^{-3}$; its 'flat' RMS intensity variation is 0.28; and its hottest spots have a relative intensity of 1.78. Although these values are slightly inferior relative to those of the strand design of FIG. 7A, the zero-field node is now substantially circular, which we believe to be an advantageous starting point for stacking multiple strands within a shell.

We note that strands designed to be greater in overall size relative to those of the two examples above (while maintaining the same-sized hexagonal perimeter cells) will necessarily be comprised of more perimeter cells and, thus, more degrees of freedom for flattening the field. On the other hand, the pair of strand designs (recall FIGS. 7A and 8A) is sufficiently small in overall size, as to be more amenable to directly stacking the strands into preforms. Given the latter (practical) benefit, we therefore utilize these smaller strand structures in the designs that follow. It is to be noted, however, that larger-sized strands may, indeed, find a niche in fabrication schemes in which these larger strands are first drawn from a strand-preform and then stacked into a shell-preform.

Figures 9A, 9B:
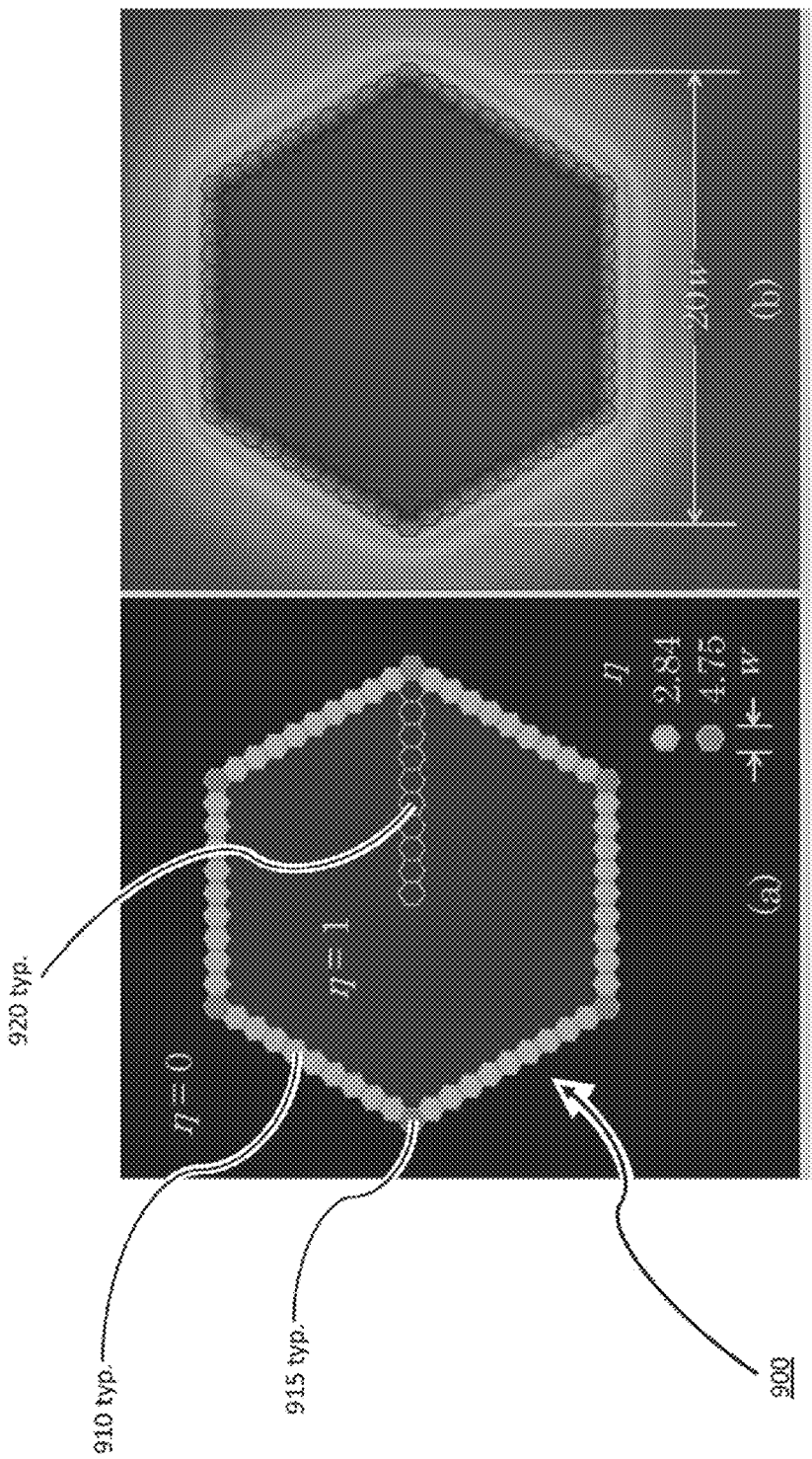
FIG. 9A shows a hexagonal field-flattened shell that will hold an array of suitable strands (here, an array of seven).
FIG. 9B shows the field of the flattened mode in the vicinity of the shell using the design of FIG. 9A.

Using the hexagonal strand designs of FIGS. 7A and 8A, the next step is to create an hexagonal field-flattened shell, within which will support an array of suitable strands (in this case, an array of seven strands). FIG. 9A shows an optimized hexagonal shell design 900, without interior strands (i.e., an "empty" shell). Given the merits of the optimized strand design (FIG. 8A) relative to that of a uniform strand design (FIG. 7A), the same design rules are applied in the case of the shell design. Specifically, referring to the shell design in FIG. 9A, the indices of the corner cells 915 differ from those along the hexagon's sides 910. As is the case of the strand designs above, the refractive index inside the shell is the same as the index outside the shell, and the coating of the perimeter cells all have the same index and width. For clarity, FIG. 9A outlines only a few of the interior cells 920.

FIG. 9B shows the resultant field of the flattened mode within the (empty) shell. We note that in the case of a uniform-index coating around an empty shell (not shown), whereby the refractive indices of the corner and side cells are the same, the resultant in a field distribution possessesd an index error of $2.6\times10^{-3}$; with a RMS variation and relative intensity peak of 0.033 and 1.1, respectively (recall, that, ideally, these respective values should be 0.0, 0.0 and 1.0). Adjusting the indices of the six corner cells 915 improves the performance significantly, using the design 900 shown in FIG. 9A. The resultant field distribution in FIG. 9B shows a an optimized hexagonal (empty) shell design with an index error of $8.2\times10^{-5}$; and, with a RMS variation and relative intensity peak of 0.0017 and 1.016, respectively, which validates the improved performance of this shell design.

Figures 10A, 10B:
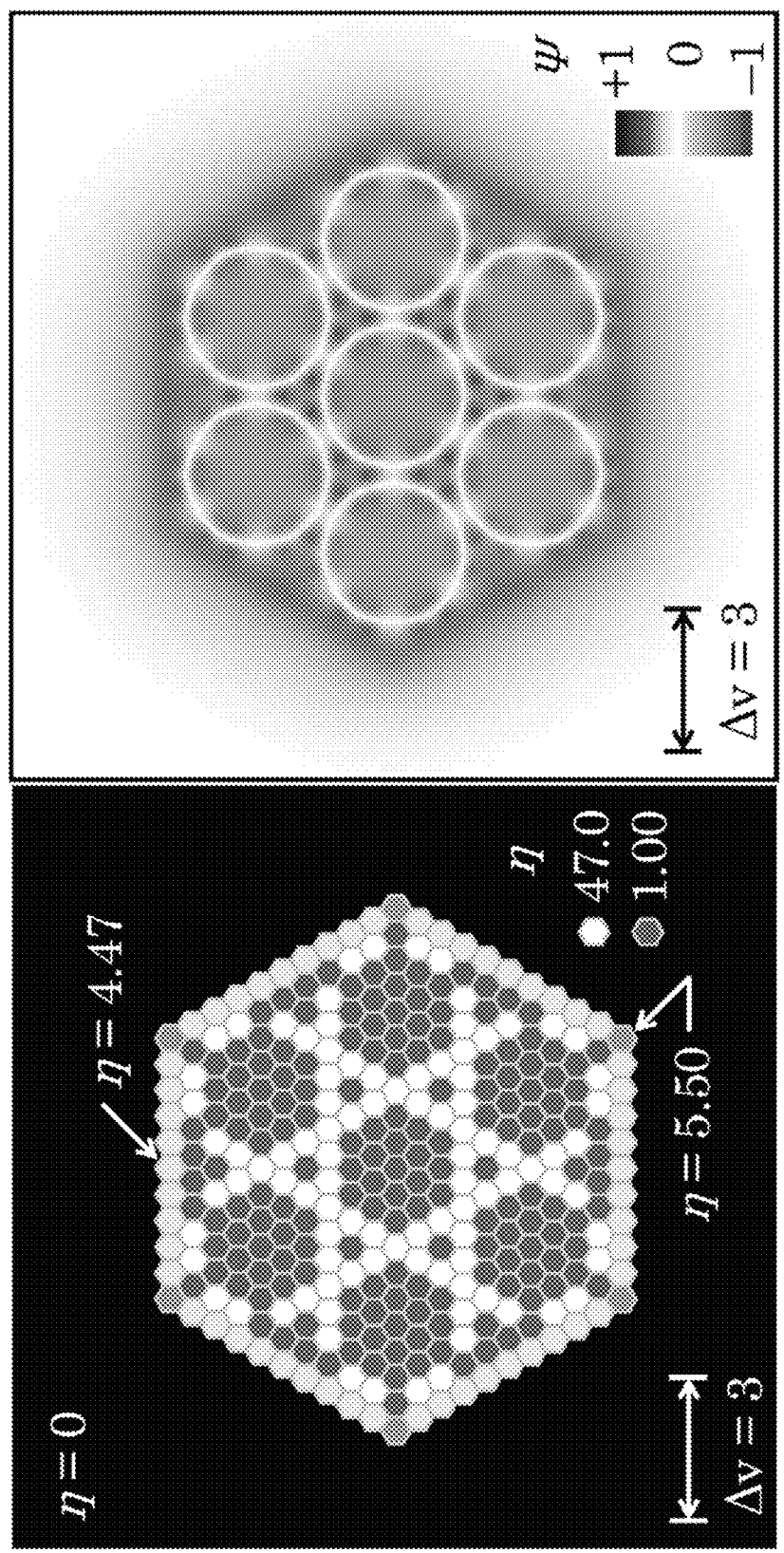
FIG. 10A shows an optimized composite strand/shell design created by stacking seven of the strands from FIG. 8A into the shell of FIG. 9A. The normalized refractive indices are as shown, and the size of all cells is $\Delta v=0.55$, measured across the flat sides of the hexagons.
FIG. 10B shows the field of the resultant flattened spatial mode, as supported by the strand/shell structure using the design of FIG. 10A.

The final steps are to (mathematically) incorporate the seven strands into the shell and to optimize the resulting patterned, flattened mode. FIG. 10A shows an example of a composite structure, comprised of a hexagonal shell (of FIG. 9A), within which are stacked an array of seven identical hexagonal strands (each of FIG. 7A). FIG. 10B depicts the resultant field-flattened amplitude of the composite design shown in FIG. 10A. The effective index error for this specific design is essentially zero, but the intensity flatness and the relative intensity peak (0.33 and 1.76, respectively) are somewhat degraded from that achieved for either an empty shell or a single strand in a shell. Nevertheless, this design is indicative of the variety of configurations possible, especially using hexagonal elements. Further improvements in the performance are anticipated using optimized coatings, cell sizes, etc. In general, the design philosophy discussed herein can lead to fibers of large effective area and field-flattened single-mode operation, both properties of which are critical to next-generation optical-fiber-based systems.

Noncircular Shapes

Figures 11A, 11B:
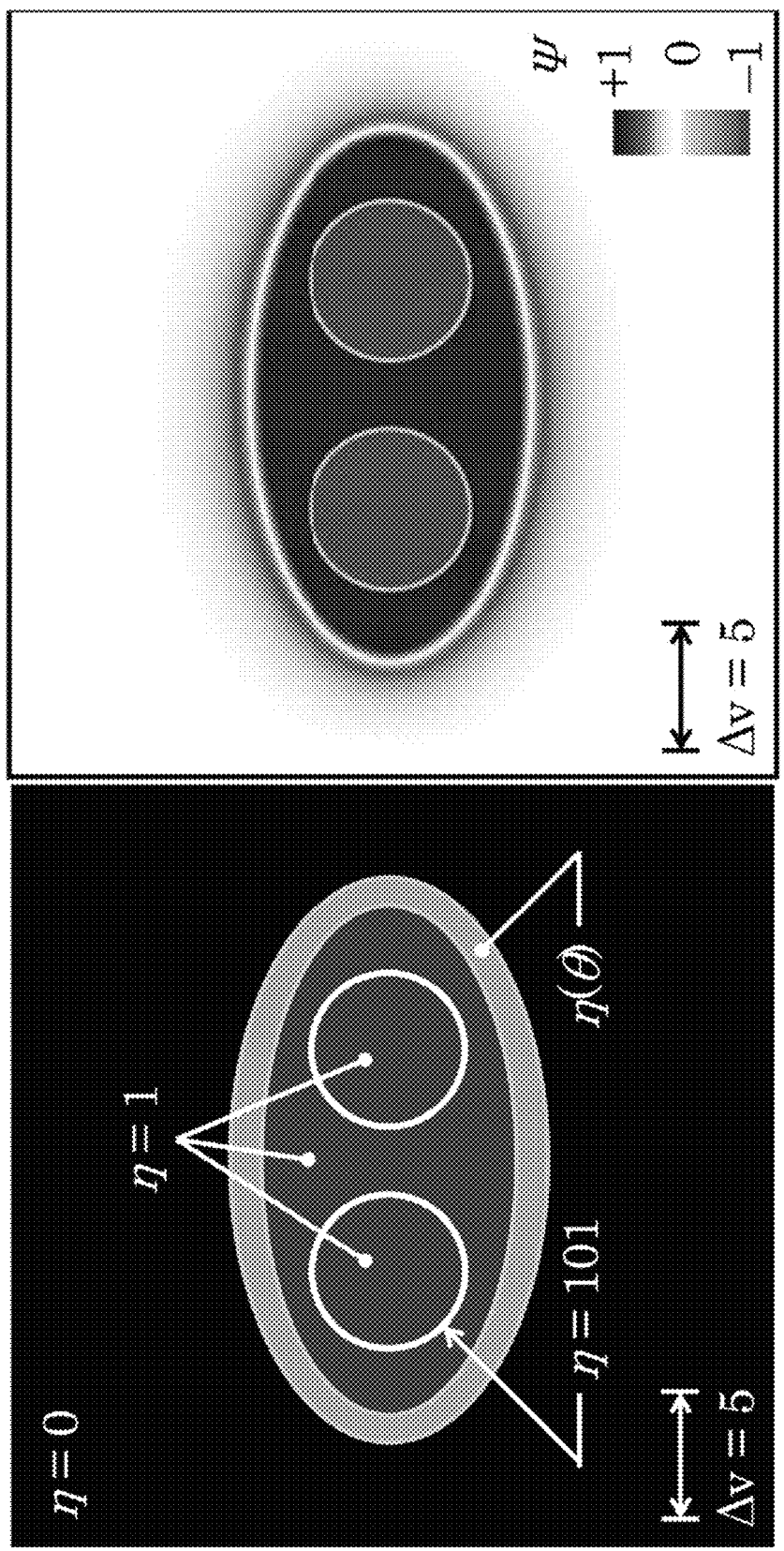
FIG. 11A shows a design for an elliptical shell holding circular strands.
FIG. 11B shows the field of the resultant elliptical patterned flattened mode.

Various noncircular shapes are also possible. For example, shells or strands (or both) can be elliptical. FIGS. 11A and 11B show an elliptical shell that contains two circular strands. FIG. 11B shows the field of the resultant elliptical patterned flattened mode. The strands each have a diameter of $\Delta v=6$; the shell's inner boundary has a major diameter of $\Delta v=20$ and a minor diameter of $\Delta v=10$; and the shell's outer boundary has a major diameter of $\Delta v=22.17$ and a minor diameter of $\Delta v=12.46$. The strands centers are separated by $\Delta v=8.75$, but the separation can be smaller so long as the strands do not overlap or larger so long as the strands remain inside the shell. The figure lists the normalized indices of the cladding, the field-flattened regions, and the strands' coating. The normalized index of the shell's coating follows the function:

$$\eta(\theta)=a_0+a_2\cos(2\theta)+a_4\cos(4\theta)+a_6\cos(6\theta)+a_8\cos(8\theta)$$

where the azimuthal angle $\theta$ is measured from the center of the ellipse and for this example, $a0=10$, $a2=-1.197$, $a4=0.317$, $a6=-0.019$, and $a8=-0.047$.

Many designs for noncircular shells or strands are possible. Such designs must generally be determined iteratively, by computer, by systematically varying the thickness of a coating or its index (or both) as a function of position in order to optimize the mode's flatness.

Fabrication

Waveguides that support a patterned, flattened mode can be fabricated by well-known vapor-deposition techniques or photonic-crystal stack-and-draw techniques, though with additional fabrication steps.

Figure 12B:
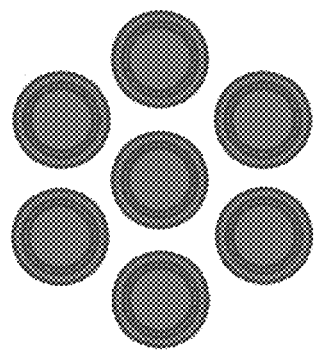
FIG. 12B shows strand-canes drawn from a strand-preform.
Figure 12D:
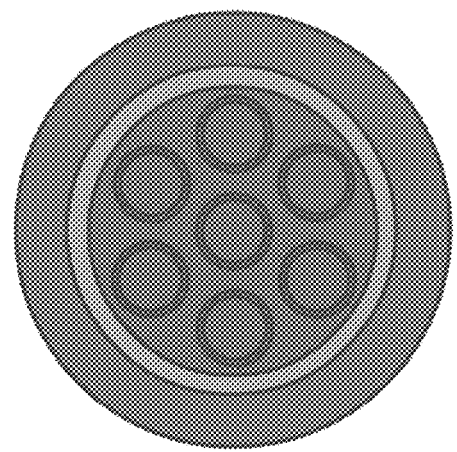
FIG. 12D shows a fiber drawn from the preform of FIG. 12C.
Figure 12A:
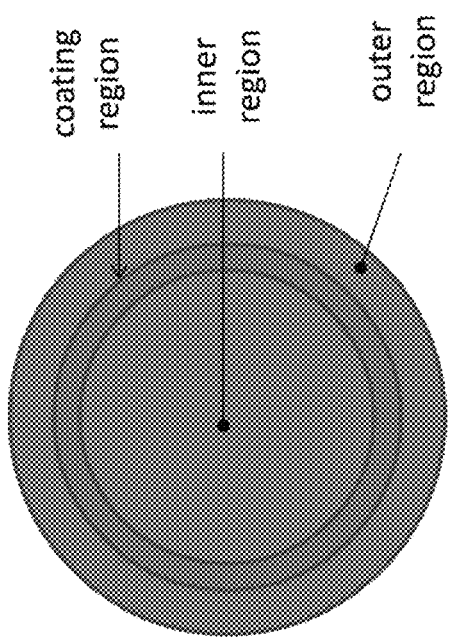
FIG. 12A shows a notional strand-preform formed by vapor deposition techniques.
Figure 12C:
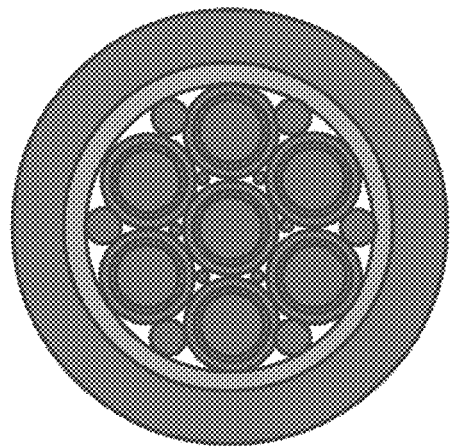
FIG. 12C shows strand-canes stacked inside a vapor-coated shell; where the vapor coating forms a field-flattened shell in the final drawn optical fiber.

FIGS. 12A-D illustrate a sequence of steps for fabricating flattened-mode fibers via vapor-deposition techniques, such as the well-known modified chemical vapor deposition or outside vapor-deposition techniques that are commonly used to fabricate telecommunications-grade optical fibers. FIG. 12A shows a notional strand preform that incorporates an inner region, a coating region, and an optional outer region. The regions are deposited by vapor deposition techniques; the refractive indices of the regions their dimensions, when drawn into the final optical fiber, follow the teachings of the present invention. The overall size of the strand preform is typically 10-50 μm. The strand preform is then drawn, using well-known glass drawing techniques, into a number of strand canes (FIG. 12B), each typically having a precisely controlled diameter that typically ranges from 1-5 μm. The strand canes are then stacked into an array and inserted into a tube on whose inner wall has been deposited a coating which, when drawn into the final optical fiber, will have the refractive index and dimensions that form the shell of the present invention; the strands-canes and shell-coated tube, together with optional filler rods, form a new preform, FIG. 12C. This new preform is then drawn into optical fiber via well-known drawing techniques. The fiber is illustrated in FIG. 12D. Alternatively, the new preform may be drawn into more canes that are then stacked into a newer preform, that may in turn be drawn into optical fiber or canes for another preform, et cetera.

FIGS. 13A-D illustrate a sequence of steps for fabricating flattened-mode fibers via photonic crystal stack-and-draw techniques. FIG. 13A shows a notional strand preform that incorporates an inner region and a coating region; a region outside the coating, whose refractive index is equal to that of the field-flattening region, may optionally be added. The regions are formed by stacking solid rods, hollow tubes, or a mixture of the two, into an appropriate arrangement; the arrangement, the refractive indices of glass materials, and their dimensions follow the teachings of the present invention. The overall size of the strand preform is typically 10-50 µm. The strand preform is then drawn, using well-known glass drawing techniques, into a number of strand canes (FIG. 13B), each typically having a precisely controlled diameter that typically ranges from 1-5 µm. The strand canes are then stacked into an array and inserted into a tube on whose inner wall is formed of rods or capillaries to form, which, when drawn into a fiber, produce the coating for a field-flattened shell. The combined strands-canes and shell-coated tube, together with optional filler rods, form a new preform, FIG. 13C. This new preform is then drawn into optical fiber via well-known drawing techniques, FIG. 13D. Alternatively, the new preform may be drawn into more canes that are then stacked into a newer preform, that may in turn be drawn into optical fiber or canes for another preform, et cetera.

Hybrid preforms, combining strands and coatings formed by vapor deposition and photonic crystal techniques, may also be fabricated to accomplish the patterned-flattened mode fibers of the present invention.

REFERENCES (INCORPORATED HEREIN BY REFERENCE)

1. A. K. Ghatak, I. C. Goyal, R. Jindal, SPIE Proceedings vol. 3666, pp. 40 (1998).
2. J. Fini and S. Ramachandran, Opt. Lett. 32, 748-750 (2007).
3. L. Michaille, C. R. Bennett, D. M. Taylor, T. J. Shepherd, IEEE J. Selected Topics in Quantum Electronics, vol. 15, pp. 328-336, (2009).
4. M. Vogel, M. Abdou-Ahmed, A. Voss, and T. Graf, Opt. Lett. 34, 2876-2878 (2009).
5. L. Chi-Hung, C. Guoqing, N. Litchinitser, D. Guertin, N. Jacobsen, K. Tankala, A. Galvanauskas, Conference on Lasers and Electro-Optics, pp. 1-2, 6-11 (2007).
6. L. Dong, X. Peng, and J. Li, J. Opt. Soc. Am. B 24, 1689-1697 (2007).
7. M. J. Messerly, P. H. Pax, J. W. Dawson, R. J. Beach, J. E. Heebner, submitted to Optics Express.

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

We claim:

1. A waveguide that propagates a field-flattened preferred mode, said waveguide comprising:
one or more strands, a shell that surrounds all of said one or more strands, and a cladding that surrounds said shell;
wherein said shell comprises a shell refractive index structure configured to induce the field of said preferred mode to have a gradient of zero or nearly zero along the interior perimeter of said shell refractive index structure and to decay with increasing distance in said cladding; and
wherein each of said one or more strands comprises a strand refractive index structure configured to induce the field of said preferred mode to have a gradient of zero or nearly zero along the exterior perimeter of said strand refractive index structure and wherein the centroid of at least one of said strands is displaced from the centroid of said shell.

2. The waveguide of claim 1, wherein said shell refractive index structure comprises one or more shell layers, wherein said strand refractive index structure of said one or more strands comprises strand layers and wherein at least one of the thickness and refractive index of said strand layers and at least one of the thickness and refractive index of said shell layers varies with position within said strand layers and said shell layers respectively.

3. The waveguide of claim 1, wherein said strand refractive index structure of at least one of said one or more strands is configured to induce said field of said preferred mode to have a gradient of zero or nearly zero along the interior perimeter of said strand refractive index structure.

4. The waveguide of claim 3, wherein the magnitude of the field inside all strands is about the same.

5. The waveguide of claim 3, wherein the magnitude of the field inside all strands varies systematically with position.

6. The waveguide of claim 3, wherein the magnitude of the field inside the strands differs from the magnitude of the field inside the shell and outside of the strands.

7. The waveguide of claim 1, wherein said strand refractive index structure of at least one of said one or more strands is configured to induce the field of said preferred mode to not substantially vary with position inside said one or more strands.

8. The waveguide of claim 7, wherein one or more of said one or more shell layers, and one or more of said strand layers comprise multiple solid or hollow pieces and wherein each said solid or hollow piece comprises a cross-sectional shape selected from the group consisting of substantially circular, elliptical, rectangular and hexagonal.

9. The waveguide of claim 7, wherein one or more of said shell layers or one or more of said strand layers comprise a cross-sectional shape selected from the group consisting of substantially circular, elliptical, rectangular and hexagonal cross-section.

10. The waveguide of claim 1, wherein said waveguide is twisted continuously or periodically.

11. The waveguide of claim 1, further comprising a coating on said shell, wherein said coating, causes said field to cross through zero more than once.

12. The waveguide of claim 1, further comprising a coating on at least one strand of said one or more strands, wherein said coating causes said field to cross through zero more than once.

13. The waveguide of claim 1, further comprising a first coating on said shell and a second coating on at least one strand of said one or more strands, wherein said first coating causes said field to cross through zero more than once and wherein said second coating causes said field to cross through zero more than once.

14. The waveguide of claim 1, wherein at least one of said one or more strands comprises a rare-earth element dopant.

15. The waveguide of claim 1, wherein said shell comprises a rare-earth element dopant.

16. The waveguide of claim 1, wherein at least one of said one or more strands comprises a hollow core and wherein said cladding comprises a regular array of holes allowing light to propagate in said hollow core.

17. The waveguide of claim 1, wherein said shell refractive index structure comprises one or ore shell layers, wherein said strand refractive index structure of said one or more strands comprises strand layers and wherein at least one of the thickness and refractive index of said strand layers or at least one of the thickness and refractive index of said shell layers varies with position within said strand layers or said shell layers respectively.

* * * * *